Nov. 8, 1960  J. H. HETT  2,959,089
PANORAMIC BORESCOPE
Filed March 16, 1955  3 Sheets-Sheet 1

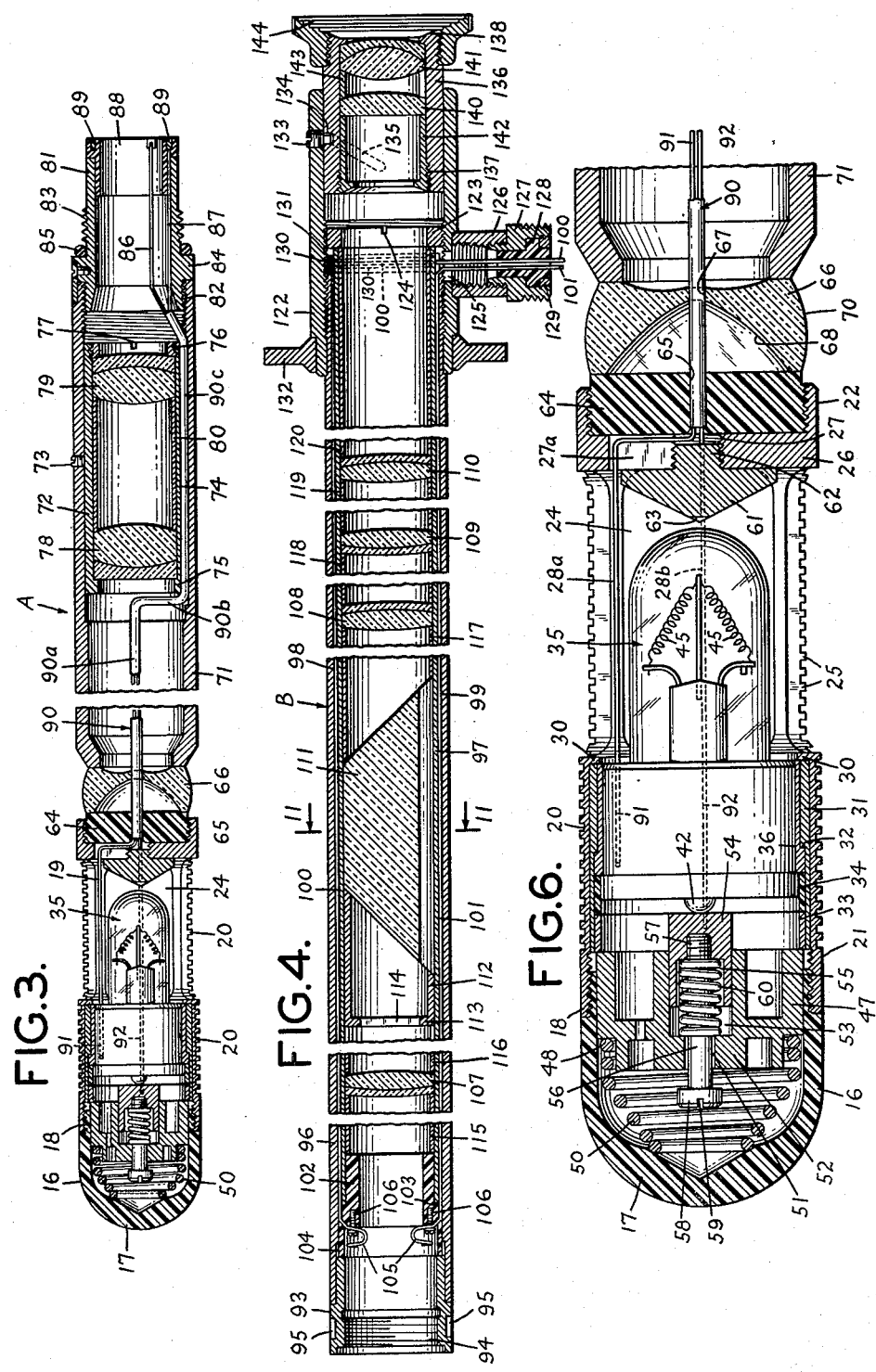

Nov. 8, 1960
J. H. HETT
2,959,089
PANORAMIC BORESCOPE
Filed March 16, 1955
3 Sheets-Sheet 3
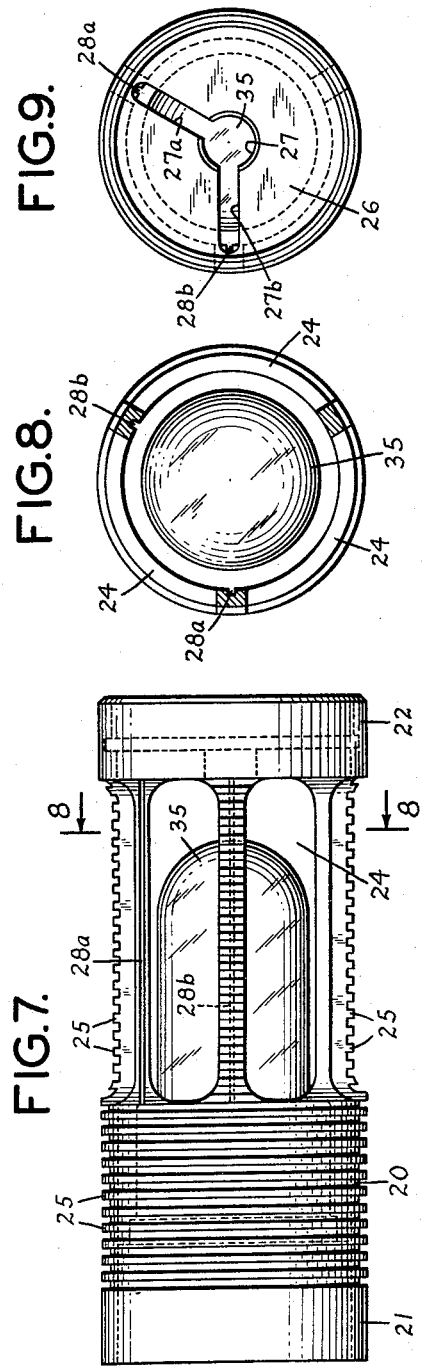
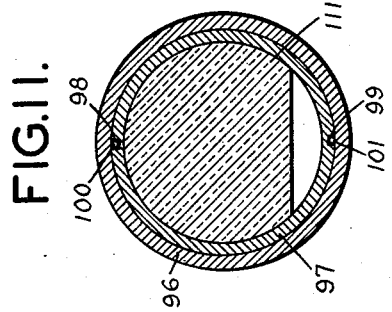
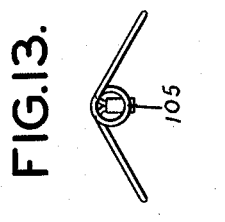
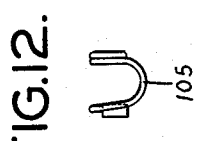
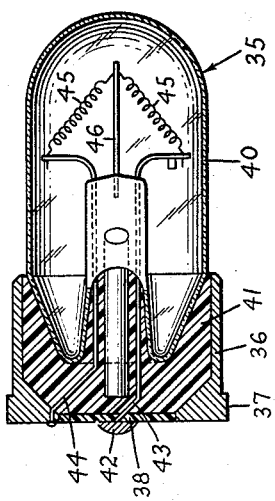

United States Patent Office 2,959,089
Patented Nov. 8, 1960

2,959,089
PANORAMIC BORESCOPE

John H. Hett, Englewood, N.J., assignor to American Cystoscope Makers, Inc., New York, N.Y., a corporation of New York Filed Mar. 16, 1955, Ser. No. 494,763

9 Claims. (Cl. 88—14)

This invention relates to an examining instrument and, in one of its more specific aspects, to an instrument that is adapted to be inserted in an opening, such as the interior of a length of tubing or the bore of a cylinder, and permit visual examination of the surface that defines such opening under conditions of illuminated vision.

The instrument of this invention permits uninterrupted examination of bores throughout a peripheral view of 360° and a zonal view of approximately 30°. The field of view of the instrument is annular but is presented flat to the eye of the viewer. Thus in examining a bore with this instrument it is not necessary to rotate the instrument, as has been essential with bore-examining devices that have been available heretofore.

The invention has for its primary object the provision of an instrument for expediting visual examination of surfaces that define bores and the like.

Another object of the invention is to provide a borescope that permits of uninterrupted examination of bores throughout a peripheral view of 360° and a substantial zonal view, thereby eliminating any need for rotating the instrument during use.

Another object of the invention is to provide an instrument of the character indicated having incorporated therein an improved lens system, the individual lenses of the system being so designed and arranged as to obtain adequate image definition with a minimum of distortion.

A further object of the invention is to provide a borescope comprising a pair of separable basic units, the borescope being adapted to be readily extended in length by interposing a light relay lens unit between the basic units.

A still further object of the invention is to provide a borescope that has improved features of design and construction, that is reasonable in manufacturing and maintenance costs, and that is capable of performing its intended functions in a satisfactory and trouble-free manner.

The enumerated objects, as well as additional objects, together with the advantages obtainable by the use of the instrument of this invention, will be readily understood by persons skilled in the art, from the following detailed description taken in conjunction with the accompanying drawings which respectively describe and illustrate complete borescopes embodying the invention and a light relay lens unit that may be incorporated in one of the borescopes when it is desired to extend the same in a lengthwise direction to obtain the other borescope.

In the drawings:

Fig. 1 is a view in side elevation, partly broken away, of a borescope constructed in accordance with the invention;

Fig. 2 corresponds to Fig. 1 and illustrates a borescope which is similar to that of Fig. 1 and which differs therefrom primarily by having incorporated therein a light relay lens unit;

Fig. 3 is an enlarged view in central longitudinal cross-section of the forward unit of the borescope shown in Figs. 1 and 2;

Fig. 4 is an enlarged view in central longitudinal cross-section of the rearward unit of the borescope shown in Figs. 1 and 2;

Figure 1:
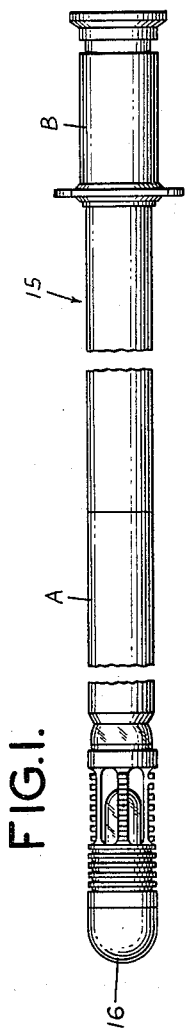
Figure 2:
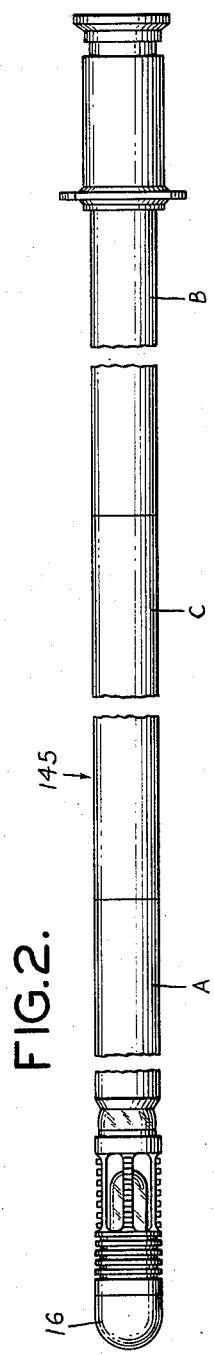

Fig. 6 corresponds to and is an enlargement of the forward portion of Fig. 3;

Fig. 7 is an enlarged view of the cage and lamp assembly shown in Figs. 1 and 2;

Fig. 8 is a view taken along line 8—8 of Fig. 7;

Fig. 9 is an end elevation view taken from the right of Fig. 7;

Fig. 10 is a central longitudinal cross-sectional view of the lamp shown in Fig. 6;

Fig. 11 is a view in enlargement taken along line 11—11 of Fig. 4; and

Figs. 12 and 13 are views, taken 90° apart, of a resilient contact element for effecting electrical connection between the ends of conductors that extend through portions of the interior of the instrument.

Referring now to the drawings, wherein like reference characters denote corresponding parts throughout the several views, there is illustrated in Figs. 1, 3, 4 and 6 through 13, a borescope that is generally indicated by numeral 15. The borescope shown in these figures of the drawings comprises a forward unit A (Figs. 1 and 3) and a rearward unit B (Figs. 1 and 4). Units A and B are detachably connected and are axially aligned, as shown in Fig. 1.

Unit A includes a hollow cap 16 that is made of a suitable electrical insulating material, such as one of the compositions available under the trademark "Bakelite." The cap is rounded at its closed end 17 and is externally threaded at its open end 18. A tubular metallic housing 20, which serves as a lamp cage, is internally threaded at one end 21 to engage the threaded end of the cap and is also internally threaded at its other end 22. The housing is apertured to define a plurality of fenestras 24. In the illustrated constructions there are three such fenestras for light transmission. The housing is provided with a plurality of peripheral fins 25, all finished in dull black to improve the heat-radiating characteristics of the housing.

The housing includes an integral transverse partition 26 having a central tapped opening 27 (Fig. 9). Also formed in the partition is a pair of angularly spaced radial slots 27a and 27b, which extend from opening 27 to corresponding longitudinal grooves 28a and 28b. These slots and grooves are adapted to receive electrical conductors that will be described further along herein.

The housing is machined on several diameters to form an annular shoulder 30 (Fig. 6), against which a lamp contact ring 31 is adapted to bear. Ring 31, in turn, has an annular shoulder 32. Mounted within ring 31 are a contact ring 33 and an insulating spacer ring 34.

An incandescent lamp 35 is positioned within housing 20, as best shown in Figs. 6 and 7. The lamp is illustrated in detail in Fig. 10 and includes a tubular base 36 having an annular shoulder 37. The base carries a bottom plate 38 made of electrical insulating material. A glass bulb 40 is supported in a mass of electrical insulating material 41 that is located within the base. A contact element 42 is secured to plate 38. This element and the base are series connected by electric leads 43 and 44 to filaments 45, which are supported in the illustrated position by extensions of the leads and by a support post 46.

The lamp is adapted to be inserted in the housing 20 and maintained in the position shown in Fig. 6 by rings 31, 33 and 34 and a resilient means that will next be described, having reference to Figs. 3 and 6. This means includes an electrically conductive plunger housing 47 having an annular shoulder 48. A compression spring 50 bears against cap 16 and housing 47 to normally and yieldingly urge the housing toward the right and therefore against ring 33 which coacts with ring 34 to maintain the lamp in the illustrated position. Housing 47 has a central opening 51 formed in wall 52. This opening communicates with a plunger compartment 53. A contact plunger 54 is slidable in compartment 53 and defines a spring chamber 55. A plunger rod 56 is slidable through opening 51 and is threaded at one end 57 to engage corresponding threads in the contact plunger. The rod has a head 58 which is slotted as indicated at 59 for actuation by a screwdriver. A compression spring 60 is coaxial with rod 56 and bears at its ends against housing wall 52 and contact plunger 54. This spring normally and yieldingly urges the plunger toward the right, as viewed in Fig. 6, to effect contact of the contact plunger with lamp contact element 42.

A generally conical light reflector 61 that is preferably made of polished stainless steel has an integral threaded extension 62 that engages the threads in tapped opening 27. The reflector is provided with a screwdriver slot 63. The lamp and reflector are so constructed and arranged within housing 20 as to effect desired transmission of light rays supplied by the lamp outwardly through fenestras 24.

A disc 64 is externally threaded for engagement with the internal threads in end 22 of housing 20 and is provided with an axial through opening 65. This disc is made of a material having the following properties and characteristics: (a) heat and moisture resistant; (b) low heat conductivity; (c) high mechanical strength; (d) good bonding qualities; (e) ability to withstand heat over an extended period of time; and (f) coefficient of expansion substantially the same as that of stainless steel. A preferred material for this disc is a product available under the trademark "Mycalex," which is understood to be a synthetic composition of mica and other ingredients.

A panoramic lens 66 has parallel annular end surfaces and is secured at its forward end to the rearward end of disc 64 by a suitable bonding agent. Lens 66 is in the nature of a circular mirror lens made of optical glass and having a central aperture 67 that is aligned with opening 65 in disc 64. This lens has an aluminized mirror forward surface 68 and a peripheral surface 70 that is arcuate in longitudinal section, as shown. Surface 70 is continuous and affords a peripheral view of 360°. The panoramic lens has its surfaces so formed and related as to afford a zonal view of approximately 30°.

A tubular support 71 is secured, by bonding, to the rear end of the panoramic lens. A tubular lens holder 72 is located within support 71 and is maintained in the illustrated position by a set screw 73. The lens holder is formed with an external longitudinal groove 74 and has an inwardly projecting flange 75 at its distal end. The lens support is internally threaded at its other end to receive a locking ring 76 which has an external groove (not shown) that aligns with groove 74. The locking ring has a pair of diametrically opposed end slots 77 for receiving a tool by which it may be turned in assembling or dismantling the instrument. Positioned within the lens holder is a first objective lens 78 that bears against flange 75 and a second objective lens 79 that is spaced from lens 78 by a spacing sleeve 80. The internal surface of sleeve 80 is finished dull black, to minimize light reflection. A male insert nipple 81 is externally threaded at 82 and 83 and is provided with an annular flange 84 having an outer diameter that is the same as that of support tube 71. As shown in Fig. 3, threads 82 engage the internal threads in support 71. Insert 81 carries a sealing ring 85, preferably made of a suitable synthetic rubber composition. The insert has a pair of internal grooves 86 and 87. A commutator ring 88, made of an electrical insulating material, is disposed in the male insert and carries a pair of segmental copper inserts 89.

Partly within support 71 is a tube 90 that is made of brass and that consists of a first portion 90a, a second portion 90b and a third portion 90c. Portion 90a is coaxial with the panoramic lens and extends through aperture 66 in that lens and aperture 65 in disc 64. Portion 90b of the tube is located forward of lens 78, while portion 90c is positioned in groove 74. At least the parts of tube 90 intermediate the panoramic lens and lens holder 72 are finished dull black to reduce light reflection and light scattering. A pair of electrical conductors 91 and 92 extends through tube 90. Conductor 91 makes electrical contact with contact ring 31 and thence with lamp base 36 and extends from ring 31 along groove 28a, slot 27a, through tube 90 and along slot 86 to one of the inserts 89. Conductor 92 makes electrical contact with ring 33 and thence, through plunger housing 47 and plunger 54, with contact element 42. Conductor 92 extends from ring 33 along groove 28b, slot 27b, through tube 90 and along groove 87 to the other insert 89.

Reference is next had to Fig. 4 for an understanding of the details of construction of unit B. This unit includes a female insert 93 that is internally threaded at its forward end 94 for engagement with the threaded portion 83 of male insert 81. Insert 93 is provided with a pair of diametrically opposed external slots 95, by which it may be turned with the aid of a suitable tool to effect threaded engagement with insert 81. When unit B is secured to unit A, ring 85 forms an adequate seal between these units. Unit B also includes an elongated outer tubular member 96, which is connected to insert 93 by a suitable securing means such as a set screw (not shown). An inner tube 97 is coaxial with outer tube 96 and is provided with external longitudinal grooves 98 and 99, that are spaced 180° apart. Electrical conductors 100 and 101 are respectively disposed in grooves 98 and 99. An insulator ring 102 is located in the forward end of tube 97. This ring is provided with an annular shoulder 103 that bears against the forward end of tube 97. An insulator ring 104 is disposed intermediate the forward extremity of ring 102 and the rear extremity of insert 93. A pair of resilient electrical contact elements 105 and soldered to the forward ends of conductors 100 and 101 and are secured to ring 102 by corresponding screws 106.

There is positioned within inner tube 97 a plurality of light relay lenses, namely lenses 107, 108, 109 and 110. A Dove prism 111 is also positioned within tube 97, intermediate and spaced from the lenses 107 and 108. Prism 111 is mounted in a tubular spacer 112 having an end wall 113 that is apertured to define a generally square opening 114. The Dove prism and relay lenses are maintained in the illustrated spaced apart relation by a series of tubular spacers, namely a spacer 115, positioned between ring 102 and lens 107, a spacer 116 positioned between lens 107 and spacer 112, a spacer 117 positioned between Dove prism 111 and lens 108, a spacer 118 positioned between lenses 108 and 109, a spacer 119 positioned between lenses 109 and 110 and a spacer 120 that extends from lens 110 to the rearward end of tube 97. The inner surfaces of spacers 112 and 115 through 120 are all serrated and finished dull black, to reduce light reflection.

A tubular eyepiece housing 122 is internally threaded to engage external threads at the rear end portion of outer tube 96. Housing 122 carries an externally threaded lock ring 123 having diametrically opposed slots 124 for engagement by a suitable actuating tool to effect turning. Lock ring 123, as illustrated, bears against the rear end of spacer 120 and coacts with earlier described spacers and other elements in unit B to maintain the Dove prism and relay lenses in the relative position shown. An opening 125 in eyepiece housing 122 communicates with the interior of an internally threaded brass tube 126 that is secured to the housing. Tube 126 carries an insert housing 127 that is provided with a rubber plug 128 and a retaining ring 129. A portion of conductor 100 is positioned in an annular groove 130 in tube 97 and is retained therein by a split ring 131. As shown, the rear end portion of conductors 100 and 101 extend through opening 125, tube 126, insert housing 127 and plug 128, in the order mentioned.

The eyepiece housing carries a collar 132 at its forward end and is provided adjacent its rearward end with a screw 133 having an extension 134 which registers with a spiral slot 135 in a tubular eyepiece cell 136. The eyepiece cell is internally threaded at its forward end 137 and has an inwardly extending annular flange at its rearward end 138. The eyepiece cell supports a pair of lenses, namely a field lens 140 and an eye lens 141, which are maintained in the illustrated spaced apart relation by spacing sleeves 142 and 143. Sleeve 142 is externally threaded at one end for engagement with threads 137. Field lens 140 is positioned between sleeves 142 and 143, while eye lens 141 is positioned between sleeve 143 and flange 138. The eyepiece cell is provided with a removable eyepiece cap 144.

For the purpose of briefly outlining the mode of operation of the above described embodiment of the invention, it is first assumed that units A and B are assembled with the parts in the relative positions shown in Figs. 3 and 4, respectively. These units are then joined to obtain the complete instrument shown in Fig. 1 by aligning the units with the rear end of male insert 81, positioned in the forward end of female insert 93 and turning one of the units relative to the other to effect threaded engagement between the inserts. When the instrument is fully assembled, each resilient electrical contact element 105 will bear against and form electrical connection with a corresponding copper insert 89, thereby placing conductor 100 in series connection with lamp base 36 and conductor 101 is series connection with lamp contact element 42. The free ends of conductors 100 and 101 are connected to a suitable source of electrical energy (not shown), thereby completing the circuit to and energizing the lamp.

The instrument is adapted to be introduced into a bore and advanced therealong, as desired. Supports may be provided within the bore to maintain the forward portion of the instument in desired spaced relation to the bore-defining surface. With lamp 35 energized, light rays supplied thereby are transmitted through fenestras 24 onto the bore-defining surface. Reflector 62 directs some of the rays from the lamp through the fenestras. The lamp, reflector and lamp cage 20 are so constructed and arranged as to obtain maximum light benefits. Light rays supplied by the lamp are reflected by the surface of the bore under examination, are received by panoramic lens 66 through its peripheral surface 70 and are then reflected rearwardly through the instrument by aluminized surface 68 of the panoramic lens. The function of the remaining lens elements illustrated and described will be readily apparent to persons skilled in the art.

Lamp 35 generates a considerable amount of heat during use. For this reason, the surfaces of parts adjacent the lamp are configured and treated to improve their heat-radiating properties and thus avoid damage to the instrument. Disc 64 adequately protects the panoramic lens from being damaged by heat created by the lamp.

Figure 5:
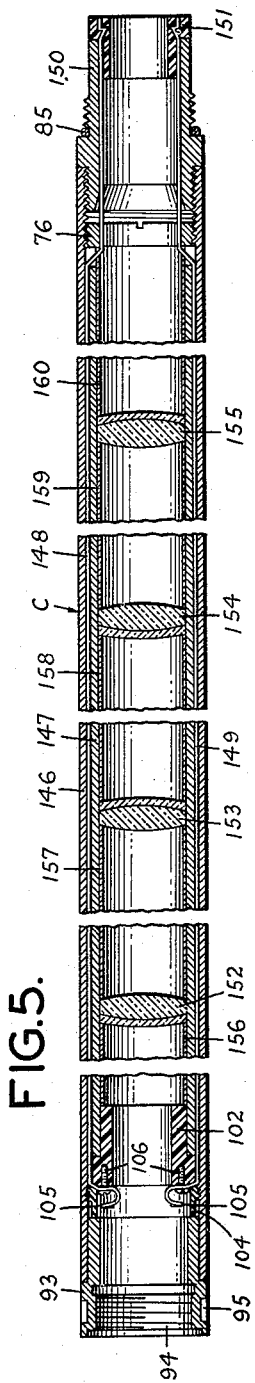
Fig. 5 is an enlarged view in central longitudinal cross-section of the intermediate or light relay lens unit of the borescope shown in Fig. 2.

Figs. 2 and 5 illustrate a modification of the invention consisting of a pair of units A and B, earlier described, and an additional unit C interposed therebetween to obtain a borescope 145 that is considerably longer than borescope 15. Unit C constitutes a light relay lens system and comprises an elongated outer tube 146 and a coaxial inner tube 147. Secured to the forward end of outer tube 146 are a female insert 93 and other elements that are duplicates of certain elements shown in Fig. 4. Inner tube 147 has longitudinal grooves (not identified in the drawings) in which are positioned conductors 148 and 149. Secured to the rearward end of tube 146 is a male insert 150 that corresponds to insert 81 earlier described. This insert carries a commutator ring 151 through which conductors 148 and 149 are adapted to contact corresponding resilient contact elements 105 of Fig. 4.

Unit C is provided with a plurality of light relay lenses 152, 153, 154 and 155. These lenses are maintained in the illustrated, spaced apart relationship by spacing sleeves 156 through 160, which correspond to sleeves 115 through 120 of Fig. 4. As shown, sleeve 156 is positioned between ring 102 and lens 152, sleeve 157 is positioned between lenses 152 and 153, sleeve 158 is positioned between lenses 153 and 154, sleeve 159 is positioned between lenses 154 and 155 and sleeve 160 is positioned between lens 155 and ring 76.

From the foregoing, it is believed that the construction, operation and advantages of my present invention will be readily comprehended by persons skilled in the art. It is to be clearly understood, however, that various charges in the apparatus set forth above may be made without departing from the scope of the invention claimed, it being intended that all matter contained in the description or shown in the drawings shall be interpreted as illustrative only and not in a limiting sense.

I claim:

1. In a borescope, tubular means, a panoramic lens secured at one side to an end of the tubular means, an eye piece secured to the other end of the tubular means, a lens system positioned in the tubular means intermediate the panoramic lens and the eye piece, an electric lamp unit secured to and projecting beyond the side of the panoramic lens remote from the tubular means, said lamp unit comprising a housing removably connected to the panoramic lens and defining a compartment remote from the panoramic lens, a lamp in the housing and comprising a base that is positioned in the compartment and a bulb that is positioned between the compartment and the panoramic lens, resilient means in the compartment biasing the lamp in the direction of the panoramic lens, said housing having at least one light transmitting opening opposite the lamp bulb, and means in the housing for reflecting through said opening light rays supplied by the lamp, and electric conductor means connected to the lamp unit, a first portion of the conductor means being disposed in the tubular means, a second portion being disposed in the lamp unit and a third portion being intermediate the first and second portions and extending through an opening in the panoramic lens.

2. In a borescope, tubular means, a panoramic lens secured at one side to an end of the tubular means, an eye piece secured to the other end of the tubular means, a lens system positioned in the tubular means intermediate the panoramic lens and the eye piece, and a lamp unit secured to and projecting beyond the side of the panoramic lens remote from the tubular means, said lamp unit comprising a housing removably connected to the panoramic lens and defining a compartment remote from the panoramic lens, a lamp in the housing and comprising a base that is positioned in the compartment and a bulb that is positioned between the compartment and the panoramic lens, resilient means in the compartment biasing the lamp in the direction of the panoramic lens, said housing having at least one light transmitting opening opposite the lamp bulb, and means in the housing for reflecting through said opening light rays supplied by the lamp, said last mentioned means comprising a reflector carried by the housing and disposed between the lamp and the panoramic lens.

3. In a borescope, tubular means, a panoramic lens secured at one side to an end of the tubular means, an eye piece secured to the other end of the tubular means, a lens system positioned in the tubular means intermediate the panoramic lens and the eye piece, and a lamp unit secured to and projecting beyond the side of the panoramic lens remote from the tubular means, said lamp unit comprising a housing removably connected to the panoramic lens and defining a compartment remote from the panoramic lens, a lamp in the housing and comprising a base that is positioned in the compartment and a bulb that is positioned between the compartment and the panoramic lens, resilient means in the compartment biasing the lamp in the direction of the panoramic lens, said housing having at least one light transmitting opening opposite the lamp bulb, and means in the housing for reflecting through said opening light rays supplied by the lamp, said last mentioned means comprising a reflector carried by the housing and disposed between the lamp and the panoramic lens, said reflector having a generally conical surface that is exposed to the lamp's light rays.

4. In a borescope, tubular means, a panoramic lens bonded directly at one side thereof to an end of said tubular means, an eye piece secured to the other end of the tubular means, a lens system in the tubular means intermediate the panoramic lens and the eye piece, said lens system comprising a relay lens, an objective lens positioned between and spaced from the panoramic lens and the relay lens, a Dove prism positioned between and spaced from the relay lens and the eye piece, a field lens positioned between and spaced from the Dove prism and the eye piece, at least one relay lens positioned between and spaced from the Dove prism and the field lens, support means bonded directly to the side of said panoramic lens remote from said tubular means, and a lamp unit secured directly to said support means.

5. A borescope in accordance with claim 4, wherein the panoramic lens has a central opening, and electric conductor means connected to the lamp unit, a first portion of the conductor means being disposed in the tubular means, a second portion being disposed in the lamp unit and a third portion being intermediate the first and second portions and extending through the opening in the panoramic lens.

6. A borescope in accordance with claim 4, wherein said lamp unit comprises a tubular housing removably connected to said support means and defining a compartment remote from the panoramic lens, a lamp in the housing and comprising a base that is positioned in the compartment and a bulb that is positioned between the compartment and the panoramic lens, and resilient means in the compartment biasing the lamp in the direction of the panoramic lens, said housing having at least one light transmitting opening opposite the lamp bulb.

7. A borescope in accordance with claim 4, wherein said lamp unit comprises a housing removably connected to said support means and defining a compartment remote from the panoramic lens, a lamp in the housing and comprising a base that is positioned in the compartment and a bulb that is positioned between the compartment and the panoramic lens, resilient means in the compartment biasing the lamp in the direction of the panoramic lens, said housing having at least one light transmitting opening opposite the lamp bulb, and means in the housing for reflecting through said opening light rays supplied by the lamp, said last mentioned means comprising a reflector carried by the housing and disposed between the lamp and the panoramic lens.

8. In a borescope, tubular means, a panoramic lens secured to one side of the tubular means, an eye piece secured to the other end of the tubular means, and a lens system in the tubular means intermediate the panoramic lens and the eye piece, said lens system comprising a relay lens, an objective lens positioned between and spaced from the panoramic lens and the relay lens, a Dove prism positioned between and spaced from the relay lens and the eye piece, a field lens positioned between and spaced from the Dove prism and the eye piece, at least one relay lens positioned between and spaced from the Dove prism and the field lens, a lamp unit secured to and projecting beyond the end of the panoramic lens remote from the tubular means, said lamp unit comprising a tubular housing removably connected to the panoramic lens and defining a compartment remote from the panoramic lens, a lamp in the housing and comprising a base that is positioned in the compartment and a bulb that is positioned between the compartment and the panoramic lens, and resilient means in the compartment biasing the lamp in the direction of the panoramic lens, said housing having at least one light transmitting opening opposite the lamp bulb.

9. In a borescope, tubular means, a panoramic lens secured to one side of the tubular means, an eye piece secured to the other end of the tubular means, and a lens system in the tubular means intermediate the panoramic lens and the eye piece, said lens system comprising a relay lens, an objective lens positioned between and spaced from the panoramic lens and the relay lens, a Dove prism positioned between and spaced from the relay lens and the eye piece, a field lens positioned between and spaced from the Dove prism and the eye piece, at least one relay lens positioned between and spaced from the Dove prism and the field lens, a lamp unit secured to and projecting beyond the end of the panoramic lens remote from the tubular means, said lamp unit comprising a housing removably connected to the panoramic lens and defining a compartment remote from the panoramic lens, a lamp in the housing and comprising a base that is positioned in the compartment and a bulb that is positioned between the compartment and the panoramic lens, resilient means in the compartment biasing the lamp in the direction of the panoramic lens, said housing having at least one light transmitting opening opposite the lamp bulb, and means in the housing for reflecting through said opening light rays supplied by the lamp, said last mentioned means comprising a reflector carried by the housing and disposed between the lamp and the panoramic lens.

References Cited in the file of this patent

UNITED STATES PATENTS

| | | |
|---|---|---|
| 2,251,739 | Huntsinger | Aug. 5, 1941 |
| 2,569,010 | Kuzmitz et al. | Sept. 25, 1951 |

FOREIGN PATENTS

| | | |
|---|---|---|
| 10,701 | Great Britain | of 1906 |
| 15,188 | Great Britain | of 1908 |
| 569,400 | Great Britain | May 22, 1945 |
| 302,447 | Germany | July 9, 1921 |
| 936,546 | France | Feb. 23, 1948 |